United States Patent [19]

Bussell

[11] 4,140,297
[45] Feb. 20, 1979

[54] LOCKABLE REGULATORY VALVE

[76] Inventor: Ray V. Bussell, 600 Oak Blvd., West Drive, Greenfield, Ind. 46140

[21] Appl. No.: 732,953

[22] Filed: Oct. 15, 1976

[51] Int. Cl.² ............................................. F16K 35/00
[52] U.S. Cl. ..................................... 251/90; 251/208; 251/285; 251/288
[58] Field of Search .................. 251/90, 92, 205, 208, 251/285, 286, 287, 288, 209, 304

[56] References Cited

U.S. PATENT DOCUMENTS

| | | | |
|---|---|---|---|
| 1,104,918 | 7/1914 | Mouat | 251/285 |
| 1,625,916 | 12/1927 | Trottier | 251/90 |
| 2,512,987 | 6/1950 | Young | 251/285 |
| 2,536,275 | 1/1951 | Godshall | 251/208 |
| 2,628,588 | 2/1953 | Mehler | 251/208 |
| 2,982,148 | 5/1961 | Jackson et al. | 251/286 |
| 3,397,863 | 8/1968 | Bell | 251/285 |
| 3,519,014 | 7/1970 | Doremus et al. | 251/287 |
| 3,929,317 | 12/1975 | Cohn et al. | 251/288 |

Primary Examiner—Martin P. Schwadron
Assistant Examiner—G. L. Walton
Attorney, Agent, or Firm—Robert A. Spray

[57] ABSTRACT

An adjustable flowmeter regulatory valve lockability device, for adjustably locking a fixed maximum flow-rate setting or position of a valve, and effectively concealing its adjustability nature providing that a user may conveniently vary the flow-rate only up to pre-set maximum flow rate, but permitting a supplier, by tools and special know-how, to pre-set or lock the device to permit whatever pre-selected maximum flow-rate has been specified.

10 Claims, 5 Drawing Figures

U.S. Patent  Feb. 20, 1979  4,140,297
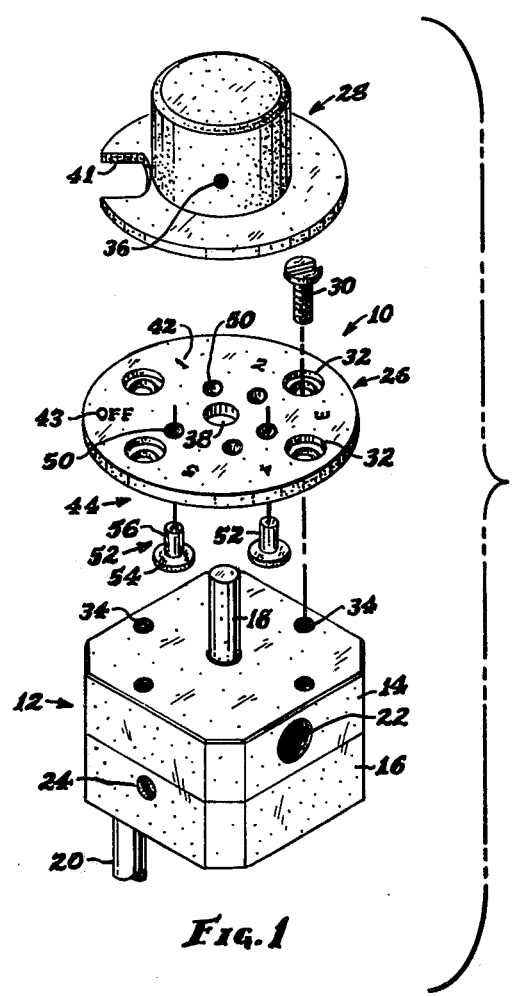
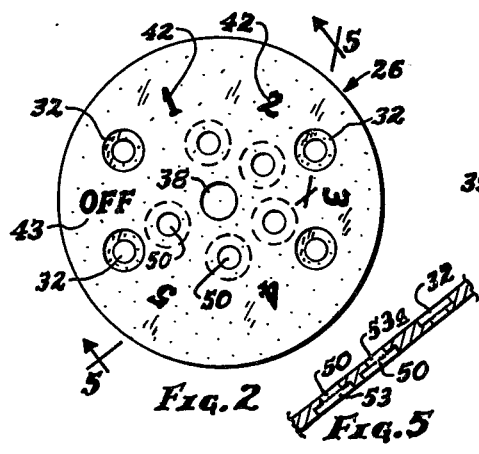
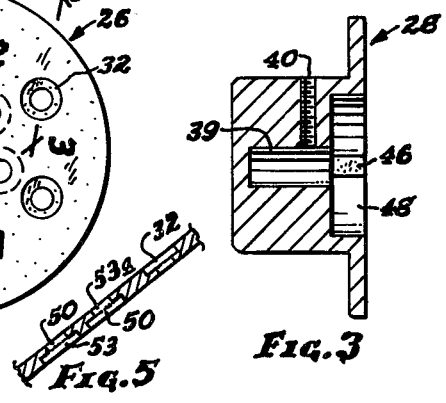
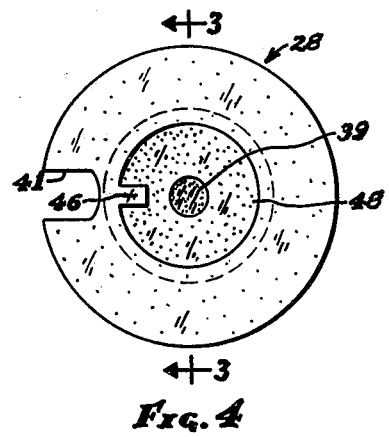
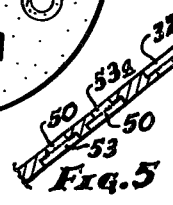

LOCKABLE REGULATORY VALVE

The present invention relates to a novel regulatory valve or flowmeter device, and more particularly to a valve which may be desirably used in the regulation of oxygen in its medical use in oxygen therapy, a vital therapy for many diseases.

Concepts of the present invention basically provide a new and advantageous lockable valve, which can be set or fixed to provide a selected one flow rate which permits only a certain maximum flow-rate, depending on the patient and his condition; and the adjustability-nature is effectively concealed to the user, setting of such valve cannot be easily changed by the user, even though it can be readily changed by the supplier.

This provides the great advantage of permitting many patients to utilize the tremendous benefits of an oxygen therapy program, which heretofore has been denied to many because physicians have been aware of the long-known abuses of oxygen therapy, and it also provides a means for bettering the oxygen therapy of many patients who have been given this advantageous therapy in spite of those long-known abuses.

It has been long known that oxygen has been and is a very beneficial therapy measure for many diseases, and oxygen therapy has been long prescribed by physicians. Such conditions include such ailments or diseases as chronic respiratory and heart ailments, such as emphysema, chronic bronchitis, angina, etc. Any one of the chronic obstructive pulmonary diseases is advantageously treated by oxygen, it being probably the largest single item for treatment of those diseases.

The use of oxygen in such treatments is to help restore arterial oxygenation to a normal physiological level; and the oxygen therapy helps increase activity tolerance in ambulatory patients as part of their general physical reconditioning programs.

The oxygen therapy is so effective, when properly administered, that many patients who used to be considered to be respiratory cripples can be sufficiently helped by proper oxygen therapy that they may undergo therapy at home instead of being hospitalized; and they may thus enjoy a longer and more comfortable life. Hospitalization savings, of tremendous amounts, are of course obvious.

However, heretofore, the oxygen treatment has been abused by patients who suppose wrongly that excess oxygen is beneficial. Indeed, it does seem to sometimes give the patent the illusion of a temporary lift; but physicians have long known that the excess oxygen may be damaging. Thus not only have such users been damaged, but the known abuse has caused physicians to refuse or hesitate to prescribe the advantageous oxygen therapy even though if properly administered it would be very beneficial to the patient.

Part of the damage is the resulting imbalance of arterial oxygenation, which upsets much of the body's physiological factors, some of which are quite critical to a person's comfort, health, and well-being.

After all, the oxygen rate is medically prescribed to be only a certain amount or flow rate, on the basis of significant factors such as blood gas assays or studies, and particulars of that individual patient and his condition or disease. And when the patient increases his oxygen flow rate, in his natural desire for faster recovery or an apparent or temporary lift, such dangerous increases in oxygen flow rate having been permitted by prior valves, the patient is hurting instead of helping his therapy and his recovery.

Part of the attempts of the medical profession to curb the abuses of excess oxygen by over-zealous patients has long been (and still is) the requirement that patients wear a so-called "venturi mask" or "precise percentage mask," which are bothersome and uncomfortable and cumbersome snorkel-type face masks which themselves have a flow-restricting effect by having a precision-sized orifice.

But not only are these masks bothersome, especially during sleeping, but breathing-restriction difficulties inherent in these masks seem to induce the patient to set his oxygen supply in excess, causing a waste of oxygen.

For this and other type of oxygen excesses, the lockability regulatory concepts of the present invention can mean a savings in oxygen use in the order of as high as about $200 per month, under existing price ranges, depending upon the specific situation of the particular patient.

Thus the concepts of the lockable valve device of the present invention provide not only a vital safeguard for oxygen therapy, but that very safeguard now permits the cautious physician to prescribe oxygen therapy where formerly the dangers of excess oxygen caused him to refrain from prescribing the helpful oxygen therapy.

The lockability concepts also provide desired advantages even with those patients who are being treated in hospitals with oxygen therapy; for it has appeared that the maximum flow rates for oxygen are abused by patients or visitors, perhaps even by persons of the hospital staff. And the excess oxygen can of course damage the hospitalized patient just as has been indicated for home-therapy patients.

Further, the concepts of the lockable flow rate regulatory valve provide that it may be set or fixed by the supplier to provide any selected one of several maximum flow rates, depending upon the factors utilized by the physician in his overall consideration of the patient and the disease factors.

The concepts further provide that the lockability feature may be incorporated into or unto an oxygen valve of an existing type and style.

The above description is of an introductory and generalized nature, particularly to mention the general objects and achievements and desirability of the present invention, and to indicate the background and long-felt need of a satisfactory lockable valve device particularly desirable and advantageous in oxygen therapy.

More particular and specific concepts, features, and details are set forth in the following more detailed description of an embodiment illustrative of the invention's concepts, taken in conjunction with the accompanying drawings.

In those drawings, which are somewhat schematic and diagrammatic in nature, it will be noted as follows:

FIG. 1 is an exploded pictorial view of a lockable valve device of a desired embodiment of the present invention;

FIG. 2 is a plan view of the flow lock and indicator plate shown in FIG. 1;

FIG. 3 is a cross-sectional view of the control knob shown in FIG. 1, this view being generally as taken by Section-line 3—3 of FIG. 4;

FIG. 4 is a bottom view of the control knob of FIGS. 1 and 3; and

FIG. 5 is a fragmental cross-sectional view through the lock plate of FIGS. 1 and 2; taken generally as indicated by Section-line 5—5 of FIG. 2.

In the drawings, the novel lockability feature is illustrated by a locking device 10, in conjunction with a known valve, that known valve being the oxygen valve 12 of Essex Cryogenics, of St. Louis, Missouri, PN 0350380100-1.

Such Essex valve 12 is here shown and mentioned, not because said valve is itself to be here patented nor to indicate any necessity of that valve being the only type valve with which the present lockability feature or locking device 10 of the present invention may be advantageously utilized, but rather to show an embodiment of the use of the lockability feature of the present invention.

Such Essex oxygen valve 12 components thus are here briefly described as background. As its most obvious components, it is noted that the Essex valve 12 includes an upper body member 14 and a lower body member 16, which a control shaft 18 extending vertically upwardly from the upper body member 14.

Gas-flow through the Essex oxygen valve 12 is upwardly through an inlet fitting 20 extending upwardly into the lower body 16; then after passing through metering means (not shown) interiorly of the valve 12, the oxygen passes in a metered-flow amount outwardly through a threaded discharge outlet 22 shown on a side face of the upper body member 14.

The control shaft 18 of the Essex valve 12 is held in any optionally-selected position (each of which positions provides or controls a certain specific oxygen flow rate) by means not shown except as indicated by an outer set screw 24 of detent or other valve-position-maintaining mechanism interiorly of the valve 12.

The Essex valve 12 also provides a flow-indicator plate which is in the present invention replaced by a flow lock indicator plate 26, as hereinafter described more fully, and also a control knob which is herein replaced by a control knob 28, also as hereinafter described.

Screws or bolts 30 (four in this embodiment) hold the indicator plate 26 to the upper body 14 by passing through shouldered openings 32 in the plate 26 and into threaded openings 30 in the valve's upper body 14; and a set-screw 36 holds the knob 28 to the shaft 18.

The indicator plate 26 has a central opening 38 through which the control shaft 18 extends, that shaft 18 extending into a bore 39 of the cap or knob 28, where the shaft 18 is tightly engaged by the knob's set screw 36 threaded into the knob's radially-extending threaded hole 40.

The cap 28 is provided with an opening 41, by which the user can see the numerals 42 or "Off" phrase 43, to see what the flow rate is.

As so far described in this numerical description, the mechanism is the above-designated Essex oxygen valve 12, and as such forms no part of the present invention, being shown and described as background as mentioned above.

Turning now to the flow-metering locking and adjustability-concealing concepts of the present invention, it has already been pointed out that the present inventive concepts provide a new and advantageous adjustable flowmeter regulatory valve lockability device 10 for locking the associated rotary valve 12 into a fixed maximum flow-rate setting or position.

According to concepts of the present invention, there is provided a flow lock type of indicator means or plate 26 fixed to the associated valve 12; and there are provided what is here referred to as first adjustable means 44, hereinafter described, which provide the valve-locking feature, and which are adjustably fixed to the said associated valve body 12 or in this embodiment to its flow lock indicator plate 26 which is fixed to the valve body 12.

It is particularly to be noted that the said first adjustment means 44 are of a type different from the adjustment means which are provided by the valve's rotational control shaft 18.

That is, the adjustment provided by control shaft 18 is simply a rotation of the shaft 18, by rotating the control knob 28, purposefully easy for the user to do, and with no tools or special know-how at all.

However, quite in contrast, the said first adjustable means 44 which are fixedly settable or positionable to accommodate rotation of the rotary valve's rotational control shaft 18 through only its movement up to that in which a specific maximum flow-rate is permitted, and which permits adjustability to a lesser but not higher flow-rate or rates by rotation of the knob 28 and thus also the valve's control shaft 18, are made such as to be quite concealed and to need tools and require significantly more know-how; and thus the user cannot readily perceive how more conveniently change the maximum setting of the oxygen flow-rate.

More particularly, the said first adjustment means 44 are adjustable to vary the maximum permitted flow-rate only by at least removal of the control knob 28 of the valve's rotary control shaft 18, or only by at least removal of the flow lock indicator plate 26, or, in the illustrated embodiment, by removal of both of the control knob 28 of the valve's rotary control shaft 18 and also of the flow lock indicator plate 26.

It is noted, as hereinafter detailed, that the first abutment means 44 is carried by the flow-rate lock plate 26 itself, that is, the plate which is fixed to the valve body 12 and which is provided with numerals 42 or other indicia including the "Off" phrase 43 to indicate the flow-rate. This provides economy and simplicity, by providing that the plate 26 provides the double function of an indicator plate and a flow-rate lock component.

For association with the plate's lock means 44, there is provided an associated rotatable abutment means carried by the valve's control shaft 18 or knob 28, here shown as an abutment 46 which extends inwardly into a large bore 48 at the lower end of the control knob 28 for a purpose now to be made apparent.

In the illustrated embodiment, the said first adjustment means are fixedly held relative to the associated valve 12 by the said flow lock plate 26 being assembled (by screws 30) onto the said associated valve's upper body member 14.

More particularly as shown, the said first adjustment means 44 are provided by providing openings 50 in the flow lock indicator plate 26 and by providing abutment pins 52 which are adjustably inserted in selected ones of the said plate-openings 50; and those pins 52 are abuttingly engageable by the associated rotatable abutment means here shown as the lug 46.

It will be seen that in the illustrative embodiment the control knob 28 effectively conceals both the rotatable abutment 46 and fixed abutments 52, concealing effectively the entirety of the maximum-flow adjustability features, and, further, that the said abutment pins 52 are fixedly held relative to the associated valve 12 by the said flow lock indicator plate 26 being assembled onto the said associated valve's body member 14, thus not only achieving some economy and double-function of the knob 28 and indicator plate 26, but assuring that disassembly must include that of the plate 26 before the maximum flow-rate can be altered.

In the illustrated embodiment, the said openings 50 in the flow lock plate 26 are of shouldered nature, in which the hole-portion 53 adjacent the associated valve body member 14 is of larger diameter than the hole-portion 53a adjacent the valve's control knob; and the abutment pins 52 are headed shaft-like members whose heads 54 are received in the respective hole's larger-diameter portion, and the shaft portions 56 of the pins extend through the respective hole's smaller-diameter portion and outwardly of the flow lock plate 26 for abutting engagement with the movable (rotatable) abutment means 46 shown here as carried by the valve's control knob 28.

It will be noted that FIG. 1 illustrates a setting of the two pins 52 to provide a maximum flow-rate designated by the numeral "3," that is, the control shaft 18 can be turned only between the "Off" position and the "3"-position, due to abutment with the two pins 52 by one or the other of the side-faces of the rotatable knob-lug 46. For the "5"-position, only a single pin 52 need be used; but for the other positions of maximum pre-set flow-rate, the pin 52 shown at the right in FIG. 1 would be inserted into whatever other plate-opening 50 is desired.

SUMMARY

It is thus seen that a lockable regulatory valve, according to concepts of the present invention, provides novel and advantageous concepts and features, providing not only an effective lockable valve whose maximum setting adjustability-nature is effectively concealed and which cannot be easily changed, but a lockability feature which can be provided on new equipment, or by adaptation of existing equipment, of a variety of types and sizes even though a single size and form is here shown for illustration of the inventive concepts. And even though a user cannot easily change the maximum setting, a supplier with tools and slight "know-how" can provide any single valve with a selected one of maximum settings depending upon the specification or prescription.

Particularly advantageous for valves used in oxygen therapy, it achieves desirable advantages of permitting valuable oxygen therapy to be utilized and better utilized.

Accordingly, it will thus be seen from the foregoing description of the invention according to this illustrative embodiment, considered with the accompanying drawings, that the present invention provides a new and useful lockable regulatory valve which achieves the desirable goal of achieving a lockable and practically "user-proof" valve where a maximum flow-rate is desired, having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specified form or arrangement of parts herein described or shown for illustration of the inventive concepts.

What is claimed is:

1. An adjustable flowmeter regulatory valve lockability device, for locking an associated rotary valve, having a rotational control shaft, into a fixed maximum flow rate setting or position, said device comprising, in combination:

a flow lock means fixed to the associated rotary valve body;

first adjustment means being provided, which are adjustably fixed to the said associated valve body or to its flow lock means fixed thereto;

said first adjustment means being of a type different from the adjustment means which are provided by the valve's rotational control shaft;

means providing that the said first adjustment means are fixedly settable or positionable to accommodate rotation of the rotary valve's rotational control shaft through only its movement up to that in which a specific maximum flow rate is permitted but which permits adjustability to a lesser but not higher flow rate or rates by rotation of the valve's control shaft; and in which the said first adjustment means are provided by providing openings in the flow lock means and by providing abutment pins which are adjustably inserted in selected ones of said openings, the said pins being abuttingly engageable by associated abutment means carried by the valve's control shaft or knob;

in a combination in which said openings in the flow lock means are of shouldered nature in which the hole-portion adjacent the associated valve body is of larger diameter than the hole-portion adjacent the valve's control knob;

and the pins are headed shaft-like members whose heads are received in the respective hole's larger-diameter portion and the shaft portions of the pins extend through the respective hole's smaller-diameter portion and outwardly of the flow lock means for abutting engagement with the abutment means carried by the valve's control shaft or knob.

2. An adjustable flowmeter regulatory valve lockability device, for locking an associated rotary valve to have a flow rate-limiting setting or position, said device being of a type having a flow lock means which is fixedly securable to the associated rotary valve body, and which has a relatively stationary first abutment means;

and in which device the nature of the flow lock means and the said first abutment means is such that the said first abutment means is optionally locatable with respect to the rotary valve body to thereby provide an optionally-selectable position of the first abutment means for a flow-regulating operativity mentioned below;

and the device also having a rotational control shaft and a control knob means secured to the control shaft, and the device also having a rotational second abutment means operatively fixed to the control shaft or its control knob means and operable when the control knob means is rotated to operatively abuttingly engage the said first abutment means to thereby limit further rotation of the control shaft and thereby limit the flow-rate adjustability which may be accomplished by a rotation of the control knob means;

the control knob means being provided to be of a nature which conceals the said rotational second abutment means;

in such device, the improvement comprising the provision that the flow lock means is a plate-like member which is removably securable to a face of the valve body, and which provides that the said first abutment means is adjustably locatable always only at one of a specific locational setting with respect to the valve body.

3. The invention as set forth in claim 2 in a combination in which the control knob means is provided to be also of a nature such that it conceals also the abutting engageability of the two said abutment means.

4. The invention as set forth in claim 3 in which the control knob means is provided to be also of a nature such that it conceals also the flow lock means.

5. The invention as set forth in claim 2 in which the rotational second abutment means is provided by the control knob means and concealed thereby.

6. An adjustable flowmeter regulatory valve lockability device, for locking an associated rotary valve to have a flow rate-limiting setting or position, said device being of a type having a flow lock means which is fixedly securable to the associated rotary valve body, and which has a relatively stationary first abutment means;

and the device also having a rotational control shaft and a control knob means secured to the control shaft;

the device also having a rotational second abutment means fixed to the control shaft or its control knob means;

in such device, the improvement comprising the provision that the flow lock means and its first abutment means are of such a nature that the flow lock means must be fully removed from the rotary valve body and manipulation of the first abutment means done by working on the side of the flow lock means which had been adjacent the valve body prior to any adjustment of the limiting flow-rate.

7. The invention as set forth in claim 6 in which the adjustment of the limiting flow-rate also requires the movement of the first abutment means from one reception hole to another such reception hole, said reception holes being provided in the flow lock means, and the first abutment means extends through whichever of said holes is selected and through the flow lock means.

8. The invention as set forth in claim 7 in a combination in which the said first abutment means is fixedly held relative to the associated valve by the said flow lock means being assembled onto the said associated valve body.

9. An adjustable flowmeter regulatory valve lockability device, for locking an associated rotary valve to have a flow rate-limiting setting or position, said device being of a type having a flow lock means which is fixedly securable to the associated rotary valve body, and which has a relatively stationary first abutment means;

the device also having a rotational second abutment means fixed to the control shaft or its control knob means;

the flow lock means and its first abutment means being of such a nature that the flow lock means must be fully removed from the rotary valve body and manipulation of the first abutment means done by working on the side of the flow lock means which had been adjacent the valve body prior to any adjustment of the limiting flow-rate;

in which the adjustment of the limiting flow-rate also requires the movement of the first abutment means from one reception hole to another such reception hole, said reception holes being provided in the flow lock means, and the first abutment means extends through whichever of said holes is selected and through the flow lock means;

in a combination in which said holes in the flow lock means are of shouldered nature in which the hole-portion adjacent the associated valve body is of larger diameter than the hole-portion adjacent the valve's control knob means, and the said first abutment means is a headed shaft-like member whose head is received in the respective hole's larger-diameter portion and the shaft portion of the abutment means extends through the respective hole's smaller-diameter portion and outwardly of the flow lock means for abutting engagement with the second abutment means.

10. An adjustable flowmeter regulatory valve lockability device, for locking an associated rotary valve to have a flow rate-limiting setting or position, said device being of a type having a flow lock means which is fixedly securable to the associated rotary valve body, and which has a relatively stationary first abutment means;

the device also having a rotational control shaft and a control knob means secured to the control shaft;

the device also having a rotational second abutment means fixed to the control shaft or its control knob means, and a third abutment means which is carried by or on the flow lock means or valve body for limiting flow-rate opposite to the flow-rate limitation imposed by the said first abutment means;

there being substantially only the thickness of the said first, second and third abutment means which limits the rotational movement of the valve's control shaft to less than a full 360°;

in such device, the improvement comprising the provision that the flow lock means is a plate-like member which is removably securable to a face of the valve body, and which provides that the said first abutment means is adjustably locatable always only at one of a specific locational setting with respect to the valve body.

* * * * *

UNITED STATES PATENT OFFICE
CERTIFICATE OF CORRECTION

Patent No. 4,140,297           Dated February 20, 1979

Inventor(s) Ray V. Bussell

It is certified that error appears in the above-identified patent and that said Letters Patent are hereby corrected as shown below:

Col. 1, Line 50: The word "patent" should be "patient"

Col. 4, Line 28: The word "more" should be "nor"

Signed and Sealed this

Fourteenth Day of August 1979

[SEAL]

Attest:

*Attesting Officer*

LUTRELLE F. PARKER
*Acting Commissioner of Patents and Trademarks*